United States Patent [19]
Ruffa

[11] Patent Number: 5,734,623
[45] Date of Patent: Mar. 31, 1998

[54] FIBER OPTIC SOUND VELOCITY PROFILER

[75] Inventor: Anthony A. Ruffa, Hope Valley, R.I.

[73] Assignee: The United States of America as represented by the Secretary of the Navy, Washington, D.C.

[21] Appl. No.: 838,475

[22] Filed: Apr. 7, 1997

[51] Int. Cl.⁶ .................................. G01S 3/78; G01S 3/80
[52] U.S. Cl. ........................ 367/128; 367/131; 367/902
[58] Field of Search .................................. 367/131, 128, 367/89, 91, 902; 356/28.5

[56] References Cited

U.S. PATENT DOCUMENTS

| | | | |
|---|---|---|---|
| 4,429,994 | 2/1984 | Guagliardo et al. | 356/28.5 |
| 5,379,270 | 1/1995 | Connolly | 367/128 |

Primary Examiner—Daniel T. Pihulic
Attorney, Agent, or Firm—Michael J. McGowan; Robert W. Gauthier; Prithvi C. Lall

[57] ABSTRACT

A fiber optic cable, coated to increase its sensitivity to acoustic pressure, is towed through a medium. The optical fiber contains Bragg grating sensors at regular intervals along its length. A steerable array of transducers sends a pulse of sound in the direction of the optical cable while broadband pulses of light are directed down the optical fiber. The pulses of light are selectively reflected back according to the spacing between the Bragg gratings. The sound pressure field causes a local strain in the fiber, thus changing the grating spacing. The sound velocity profile along the length of the optical cable is computed by measuring the amount of time necessary for successive Bragg gratings to respond to the acoustic pressure associated with the advancing wave front of the acoustic pulse.

10 Claims, 1 Drawing Sheet

1

FIBER OPTIC SOUND VELOCITY PROFILER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates generally to a system and method for establishing a profile of a characteristic of a medium, and more particularly to a system and method for remotely and automatically measuring the sound velocity profile of a water column.

2. Description of the Prior Art

The velocity of sound through a medium depends upon a number of factors including temperature, pressure and density. In the case where the medium is seawater, sound velocity also depends on the salinity of the seawater. In many situations it is necessary to obtain accurate measurements of sound velocity through a medium along an axis, such as obtaining a profile of sound velocity of a water column. For example, sound velocity measurements or profiles are needed for accurate sonar location of objects on the sea bottom in recovery operations or for accurate bottom mapping.

A number of different approaches have been used in the prior art. For example, U.S. Pat. No. 4,429,994 to Guargliardo et al. discloses a system for remotely determining the velocity of sound in water by means of Brillouin scattering measurements. A pulsed laser irradiates the water and the apparatus collects backscattered light and collimates this light for transfer through a Fabry-Perot interferometer to a photomultiplier. A ramp generator drives the interferometer for selecting specific frequencies for analysis, such that the instantaneous ramp voltage corresponds to the point in a frequency domain to which the digitized output corresponds. A plurality of readings from multiple laser shots is obtained for storage and computer processing to develop a three-dimensional graphic representation, the axes of which are frequency, intensity and depth.

U.S. Pat. No. 5,379,270 to Connolly discloses an apparatus for determining the velocity of sound propagation in a fluid along an axis. A wave of acoustic energy is transmitted along the axis to produce a disturbance that moves in the medium at the velocity of sound. A laser generator transmits a light pulse substantially along the axis through the fluid medium. As the light passes through the disturbance, light backscatters in a characteristic pattern that a detector senses for analysis to provide information concerning the distance traveled and the time of travel for the acoustic wave. This information is used to obtain the speed of sound in the medium.

However, the prior art approaches do not provide an accurate, rapid, direct measurement of the sound velocity for a water column having an appreciable depth. Guargliardo et al. appear to rely on the interference between laser light and thermal photons that travel in all directions in the medium. The effect is very weak and the returned signals extend over a wide band. Consequently, in order to obtain accurate measurements it is necessary to record a large number of samples. Guargliardo et al. disclose using over 200 pulses over a five second time frame in order to obtain a profile.

2

The Connolly patent is limited by the ability of the laser to penetrate the medium. While the power and frequency of the laser can be adjusted to increase penetration, the clarity or transmissibility of the medium cannot be controlled. In addition, the Connolly patent attempts to measure the particle velocity associated with an acoustic pulse in water. Since the specific acoustic impedance of water is approximately $1.5 \times 10^6$ Kg/m$^2$s, the particle velocity being measured is very small and may be difficult to measure and distinguish from noise.

SUMMARY OF THE INVENTION

Accordingly, it is an object of the present invention to provide a system and method for obtaining a velocity profile of a water column.

Another object of the present invention is to provide a system and method which rapidly obtains a velocity profile of a water column without requiring a long series of samples.

Still another object of the present invention is to provide a system and method for obtaining a velocity profile of a water column which is not attenuated by the clarity or transmissibility of the water column.

Yet another object of the present invention is to provide a system and method for obtaining a velocity profile of a water column which can be easily measured in the presence of and distinguished from noise.

Other objects and advantages of the present invention will become more obvious hereinafter in the specification and drawings.

In accordance with the present invention, a fiber optic cable is towed through a medium. The optical fiber is coated to increase its sensitivity to acoustic pressure as is well known in the art of optical hydrophones. For example, a thick plastic coating on an optical fiber has been found to increase the strain sensitivity of the optical fiber by as much as a factor of 13. B. Budiansky et al., "Pressure Sensitivity of a Clad Optical Fiber", *Applied Optics*, Vol. 18, No. 24, pp. 4085–4088, 15 Dec. 1979. The optical fiber contains Bragg grating sensors at regular intervals along its length. The Bragg gratings are burned into the optical fiber as is well known in the optical fiber art. Bragg gratings consist of periodic density variations produced in the optical fiber which are typically 5 mm to 10 mm in length. In conjunction with a broadband optical source, these gratings selectively reflect back optical energy having a frequency tuned to the wavelength of density variations. When the fiber is strained, this changes the grating wavelength and the frequency of energy reflected back. A steerable array of transducers sends a pulse of sound in the direction of the optical cable while the broadband pulses of light are directed down the optical fiber. The sound pressure field causes a local strain in the fiber, thus changing the grating spacing. The sound velocity profile along the length of the optical cable can be easily computed by measuring the amount of time necessary for successive Bragg gratings to respond to the acoustic pressure associated with the advancing wave front of the acoustic pulse. Only one acoustic pulse is necessary to obtain the velocity profile. Since the light pulse is traveling through the fiber optic cable, there is no attenuation due to the lack of clarity of the medium, thus allowing for an extended profile length. In addition, the signal strength resulting from the acoustic pulse is sufficiently above noise so as to permit accurate measurement of the velocity profile.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 2:
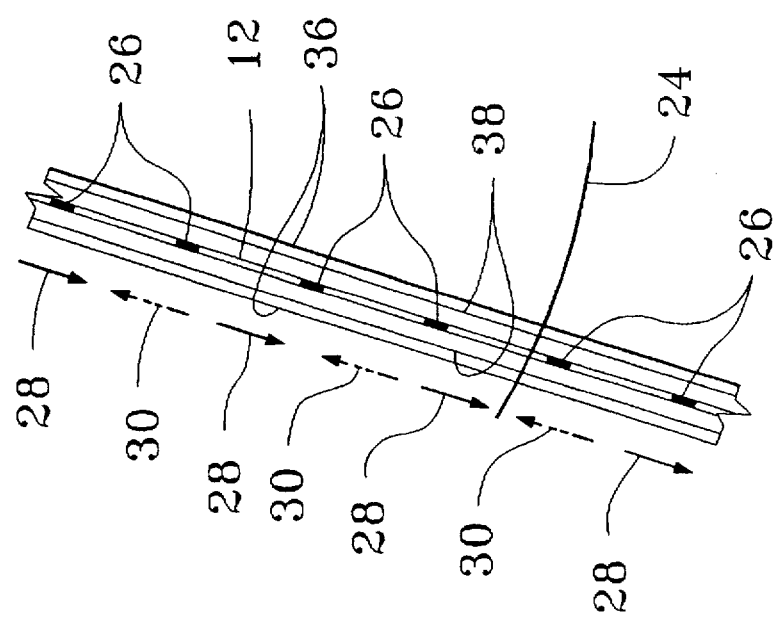
FIG. 2 is a representation of a portion of a fiber optic cable of the present invention.
Figure 1:
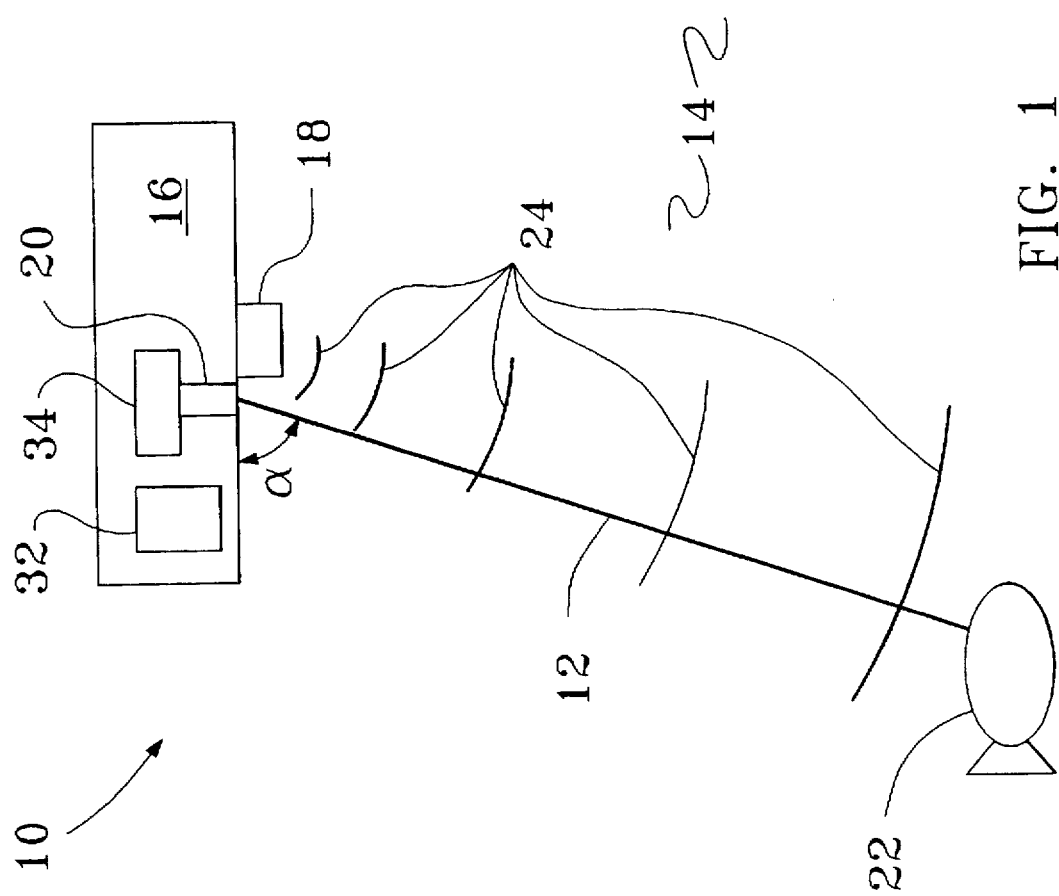
FIG. 1 is a schematic representation of the system of the present invention.

Referring now to FIG. 1, there is shown a schematic representation of a sound velocity profiler system 10 according to the present invention. A fiber optic cable 12 is towed through a medium 14 from a platform 16. A steerable array of transducers 18 is attached to platform 16. Array 18 is capable of sending a beam of sound, or acoustic pulse, having a specified frequency and amplitude in a desired direction. Optical source 20 is optically connected to cable 12 for sending pulses of light into cable 12. FIG. 1 also illustrates a heavy body 22 attached to the end of cable 12 which aids cable 12 in reaching a specified depth. In operation, array 18 sends an acoustic pulse, illustrated by wave lines 24 in the direction of cable 12. Referring now additionally to FIG. 2, there is illustrated a portion of cable 12. A series of Bragg grating sensors 26, well known in the art, are regularly spaced along cable 12. The advancing pressure front of acoustic pulse 24 causes local strain in cable 12, thus changing the grating spacing. A light pulse from optical source 20 of FIG. 1, illustrated by arrows 28, is selectively reflected back, as illustrated by dashed arrows 30, along the length of cable 12 according to the local strain in cable 12. The sound velocity in medium 14 is computed by processor 32 as a function of the amount of time necessary for successive grating sensors to respond to the advancing pressure front as measured by timer 34. The time of maximum response for each Bragg grating sensor is recorded and this time is divided by the distance to the Bragg grating sensor to obtain the velocity through the water column to the Bragg grating. The amplitude of acoustic pulse 24 can be increased as necessary to produce sufficient strain for activating sensors 26. Where broadcasting acoustic noise is a concern, the frequency of pulse 24 can be high enough such that it is attenuated at large ranges. In order to direct acoustic pulse 24 in the direction of cable 12, an estimate of the towing angle α, shown in FIG. 1, is needed. The towing angle is known in the art as the critical angle and is a function of tow speed μ, cable diameter d and weight per unit length $C_W$, i.e., $$\cos\alpha = \frac{C_W}{\rho dC_N\mu^2} + \sqrt{1 + \frac{C_W}{\rho dC_N\mu^2}},$$

where ρ is the density of seawater and $C_N$ is the cable normal drag coefficient. While the cable diameter, weight, density and drag coefficient can be accurately determined, the exact tow speed may not be easily obtained. An estimated speed is used to calculate an estimated critical angle. The acoustic pulse 22 can then be steered about the estimated critical angle until the response from sensors 26 is maximized at the true towing angle. It is to be noted that in determining the true towing angle in this way, an accurate measure of the tow speed is also provided.

The sound velocity profiler system thus described provides a simple, straightforward way of obtaining a sound velocity profile of a column of water. Each light pulse provides a full sound velocity profile along the length of the optical cable. Because the optical pulse is sent through the optical fiber, the lack of clarity in the surrounding medium does not attenuate the optical pulse, such that the length of the profile, or depth of the water column, can be extended beyond the range of prior art profiling systems.

Although the present invention has been described relative to a specific embodiment thereof, it is not so limited. For example, cable 12 can be as simple as a coated optical fiber surrounded by steel strands 36 for added strength. Such cables having diameters as small as 0.2 inches are well known in the art. Cable 12 may also be a conventional cable used to tow bodies in a medium having an optical fiber located in its core, as shown in FIG. 2 or in jacket 38. As indicated previously, steering the acoustic pulse to maximize the sensor response also provides an accurate measure of the tow speed and processor 32 may be modified to display tow speed during operation. Further, though the system is described with the optical fiber being towed, a static sound velocity profile may also be obtained when the optical cable is at rest.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for determining a velocity profile of sound in a medium comprising:
   an optical cable suspended in the medium, the optical cable having Bragg grating sensors regularly spaced along its length;
   an optical pulse generator for sending an optical pulse into the optical cable;
   an acoustic pulse generator for sending an acoustic pulse generally along the length of the optical cable, the acoustic pulse causing local strain in the optical cable, the local strain causing the Bragg grating sensors in the vicinity of the strain to selectively reflect the optical pulse back in the direction of the optical pulse generator;
   a timer for receiving the reflected optical pulse and measuring a time of arrival of the reflected optical pulse; and
   a processor for computing the sound velocity profile as a function of the time of arrival.

2. The system of claim 1 wherein the acoustic pulse generator is a transducer array.

3. The system of claim 2 wherein the transducer array is a steerable array for accurately directing the acoustic pulse along the length of the optical fiber.

4. The system of claim 1 wherein the optical pulse generator is a pulsed laser.

5. The system of claim 1 wherein the optical cable further comprises:
   an optical fiber for transmitting the optical pulse; and
   a jacket surrounding the optical fiber, the jacket providing sufficient strength to withstand forces associated with operation of the system.

6. The system of claim 1 further comprising a platform for suspending the optical cable and for housing the acoustic pulse generator.

7. The system of claim 6 further comprising a weighted body attached at an end of the optical cable opposite the platform, the weighted body assisting in extending the optical cable from the platform.

8. A method for determining a sound velocity profile in a medium comprising the steps of:

sending an optical pulse from a source into an optical cable in a first direction along a length of the optical cable;

sending an acoustical pulse along the length of the optical cable, the acoustical pulse creating areas of local strain in the optical cable as the acoustical pulse progresses along the optical cable, the optical cable selectively reflecting portions of the optical pulse from the areas of local strain, the reflected portions traveling in a second direction opposite the first direction;

measuring arrival times of the reflected portions at the source; and computing the sound velocity as a function of the arrival times.

9. The method of claim 8 wherein the acoustical pulse sending step further comprises the steps of:

estimating a critical angle of the first direction;

steering the acoustical pulse in a predetermined pattern about the critical angle; and determining a true direction at which the reflected portions of the optical pulse are maximized, the true direction corresponding to the first direction.

10. A method for determining a true speed of a platform comprising the steps of:

towing an optical cable from the platform;

estimating a towing angle of the optical cable as a function of a known weight per unit length of the optical cable, a known diameter of the optical cable and an estimated speed of the platform;

sending an optical pulse from a source into the optical cable in a first direction along a length of the optical cable;

sending an acoustical pulse along the length of the optical cable in a second direction corresponding to the estimated towing angle, the acoustical pulse creating areas of local strain in the optical cable as the acoustical pulse progresses along the optical cable, the optical cable selectively reflecting portions of the optical pulse from the areas of local strain, the reflected portions traveling in a third direction opposite the first direction;

steering the acoustical pulse in a predetermined pattern about the second direction;

determining a true towing angle at which the reflected portions of the optical pulse are maximized; and determining the true speed as a function of the true towing angle, the weight per unit length of the optical cable and the diameter of the optical cable.

* * * * *